(12) United States Patent
Burger et al.

(10) Patent No.: US 8,274,029 B2
(45) Date of Patent: Sep. 25, 2012

(54) INVERTER WITH INTEGRATED CONTROL AND REGULATION FOR A TRACKER

(75) Inventors: Bruno Burger, Freiburg (DE); Hansjoerg Lerchenmueller, Freiburg (DE)

(73) Assignees: Fraunhofer-Gesellschaft zur Foerderung der Angewandten Forschung e.V., Munich (DE); Concentrix Solar GmbH, Freiburg (DE)

( * ) Notice: Subject to any disclaimer, the term of this patent is extended or adjusted under 35 U.S.C. 154(b) by 614 days.

(21) Appl. No.: 12/518,983

(22) PCT Filed: Nov. 5, 2007

(86) PCT No.: PCT/EP2007/009576
§ 371 (c)(1),
(2), (4) Date: Jul. 6, 2009

(87) PCT Pub. No.: WO2008/071266
PCT Pub. Date: Jun. 19, 2008

(65) Prior Publication Data
US 2010/0126553 A1    May 27, 2010

(30) Foreign Application Priority Data
Dec. 13, 2006  (DE) .................. 10 2006 058 845

(51) Int. Cl.
*H01L 31/042* (2006.01)
*H02P 1/04* (2006.01)
*H02M 7/44* (2006.01)

(52) U.S. Cl. ..................... 250/203.4; 136/245

(58) Field of Classification Search ............... 250/203.4; 136/245, 246, 291
See application file for complete search history.

(56) References Cited

U.S. PATENT DOCUMENTS

| 4,223,214 | A | | 9/1980 | Dorian et al. |
| 4,320,288 | A | | 3/1982 | Schlarlack |
| 4,636,579 | A | * | 1/1987 | Hanak et al. ............. 136/245 |

FOREIGN PATENT DOCUMENTS

| DE | 100 43 525 A1 | 3/2002 |
| DE | 202 04 679 U1 | 9/2002 |
| EP | 1 632 786 A1 | 3/2006 |
| JP | 2000-196125 A | 7/2000 |
| JP | 2000223730 A | 8/2000 |
| JP | 2002373993 A | 12/2002 |
| JP | 2006319026 A | 11/2006 |
| WO | 2008/025004 A2 | 2/2008 |

OTHER PUBLICATIONS

Official Communication issued in corresponding Chinese Patent Application No. 200780046049.9, mailed on Feb. 22, 2011.
Official Communication issued in corresponding International Patent Application No. PCT/EP2007/009576, mailed on Jul. 30, 2009.
Official Communication issued in International Patent Application No. PCT/EP2007/009576, mailed on Apr. 10, 2008.
English translation of the Abstract of DE 20204679 U1.
Official Communication issued in corresponding Japanese Application No. 2009-540612, mailed on Jan. 17, 2012.

* cited by examiner

*Primary Examiner* — Seung C Sohn
(74) *Attorney, Agent, or Firm* — Keating & Bennett, LLP

(57) ABSTRACT

An inverter for converting the direct current provided by a solar generator to alternating current includes a control providing a control signal for a drive of the solar generator, for allowing tracking the solar generator after the sun, wherein the control is integrated in the inverter.

7 Claims, 2 Drawing Sheets

INVERTER WITH INTEGRATED CONTROL AND REGULATION FOR A TRACKER

The present invention relates to the field of generating electrical energy based on solar energy, and here in particular to an inverter for converting the direct current provided by a solar generator to an alternating current, wherein the solar generator comprises a drive allowing tracking of the solar generator after the sun in dependence on a control signal.

BACKGROUND OF THE INVENTION

Apparatuses for tracking a solar generator to the current position of the sun, so-called trackers, are known in the prior art, wherein one example is described in DE 202 04 679 U1. The drives of such apparatuses guide the solar generators in azimuth and/or elevation direction after the sun such that the maximally possible solar radiation impinges on the solar generator. Known plants allowing tracking in azimuth and/or elevation direction comprise, for example, at the end of a supporting pole a rotating ring for adjusting the azimuth (east-west direction) and a position rod of variable length for adjusting the elevation (inclination).

Such tracking plants or "trackers", are effectively connected to a control or regulation, respectively, which controls the tracker or its driving elements, respectively, such that the solar generator is continuously tracked to the brightest position at the sky. Such controls are constructed as individual devices and operate self-sufficiently. One example for such a control is described in DE 100 43 525 A1, which describes an apparatus for tracking a solar plant to the current position of the sun, wherein solar cells are used as sensors.

FIG. 2A shows exemplarily a known structure of a tracked solar plant. The solar plant comprises at least one solar generator 116, which comprises a plurality of solar modules 102, which generate electrical energy, for example in the form of direct current, when light from the sun 104 impinges. The solar modules 102 are mounted on a tracker 100. Adjustment of the solar generator 116 around the axes 108 and 110 is enabled via a drive of the tracker 100 not shown in FIG. 2A, wherein the drive can, for example, be mounted on a pole 106. Tracking the solar generator 116 after the sun 104 over the course of the day is enabled by the drive.

In the conventional approach shown exemplarily in FIG. 2A, in addition to the solar generator 116, the control unit 123 for the tracker 100 is provided, which is mounted on the tracker 100 in the shown example, which also carries the solar modules 102. The control unit 123 can also be provided at another position separate from the tracker 100. The control unit 123 comprises a sensor or detector 114, which generates an intensity signal in dependence on the impinging light, which is provided to a control integrated in the control unit, which itself passes a control signal to the drive 125 of the tracker 100, for ensuring optimum alignment of the solar generator 116 to the brightest point at the sky. Apart from the drive, the tracker 100 comprises also the pole 106.

The solar plant further comprises an inverter 118 which receives the direct current generated by the solar generator 116 by a connection 120 schematically shown in FIG. 2A. The inverter 118 comprises a converter means DC/AC for converting the received direct current to an alternating current. The generated alternating current is output at a schematically shown output 122 of the inverter 118.

The arrangement shown in FIG. 2A is illustrated schematically in FIG. 2B, and, as can be seen, the sensor 114 generates a sensor signal provided to a control unit 123 via the sensor signal connection 124. The control unit 123 generates a control signal for the drive 125 (motor) of the tracker 100, which is transmitted via the control signal connection 124. Further, the solar generator 116 and the inverter 118 are shown, which are connected via the electrical line 120. The inverter 118 outputs an alternating current via the line 122.

The conventional arrangement described in FIG. 2 according to which separate elements 116 and 118 or 114, 123 and 125, respectively, are used, is advantageous in that the regulation or control 123, respectively, can operate independently of the rest of the system, and can thus be operated with different solar modules and inverters.

The disadvantage of this approach, however, is that due to the plurality of elements comparatively high costs occur, and further, due to the independent operation of the tracker regulation or control 114, respectively, and the control or regulation, respectively, of the inverter 118, there is no possibility of connecting both regulations.

SUMMARY

An embodiment may have an inverter for converting the direct current provided by a solar generator to alternating current, wherein the solar generator comprises a drive allowing orientation of the solar generator in a desired direction, characterized by a control being integrated in the inverter, which provides a control signal for the drive of the solar generator for effecting tracking the solar generator after the sun.

According to another embodiment, a solar plant may have: a solar generator; and an inventive inverter.

According to a first embodiment, the inverter further comprises at least one sensor generating an intensity signal depending on the light impinging on the sensor, wherein the control receives the intensity signal and provides the control signal based on the intensity signal, wherein the inverter further comprises a control signal output to which the control applies the control signal.

According to a further embodiment, the inverter comprises a sensor signal input for receiving an intensity signal, which an external sensor generates in dependence on light impinging on the sensor, wherein the control is connected to the sensor signal input for receiving the intensity signal and for generating the control signal based on the intensity signal, wherein the inverter further comprises a control signal output to which the control applies the control signal. The external sensor is a sensor mounted on the tracker. Alternatively, the external sensor can be formed by one or several solar modules of the solar generator.

The inverter comprises a control unit comprising, for example, a processor controlling the conversion of the direct current to alternating current, wherein the control for generating the control signal for driving the solar module is integrated in this control unit.

The inventive approach of integrating the regulation/control for the tracker in the inverter is advantageous, since this effects large cost savings, since the inverter can realize this additional task with minimum extra effort. In particular, the additional costs for a further housing, additional current supply, additional interface for data exchange, a further processor etc. are omitted. Further, according to the invention, the behavior/the performance of the overall system of the solar plant is significantly increased by combining both regulations. Additionally, the overall efficiency of the tracked solar plant is increased, since the electrical losses of the additional control are also omitted.

Other features, elements, steps, characteristics and advantages of the present invention will become more apparent from the following detailed description of preferred embodiments of the present invention with reference to the attached drawings.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
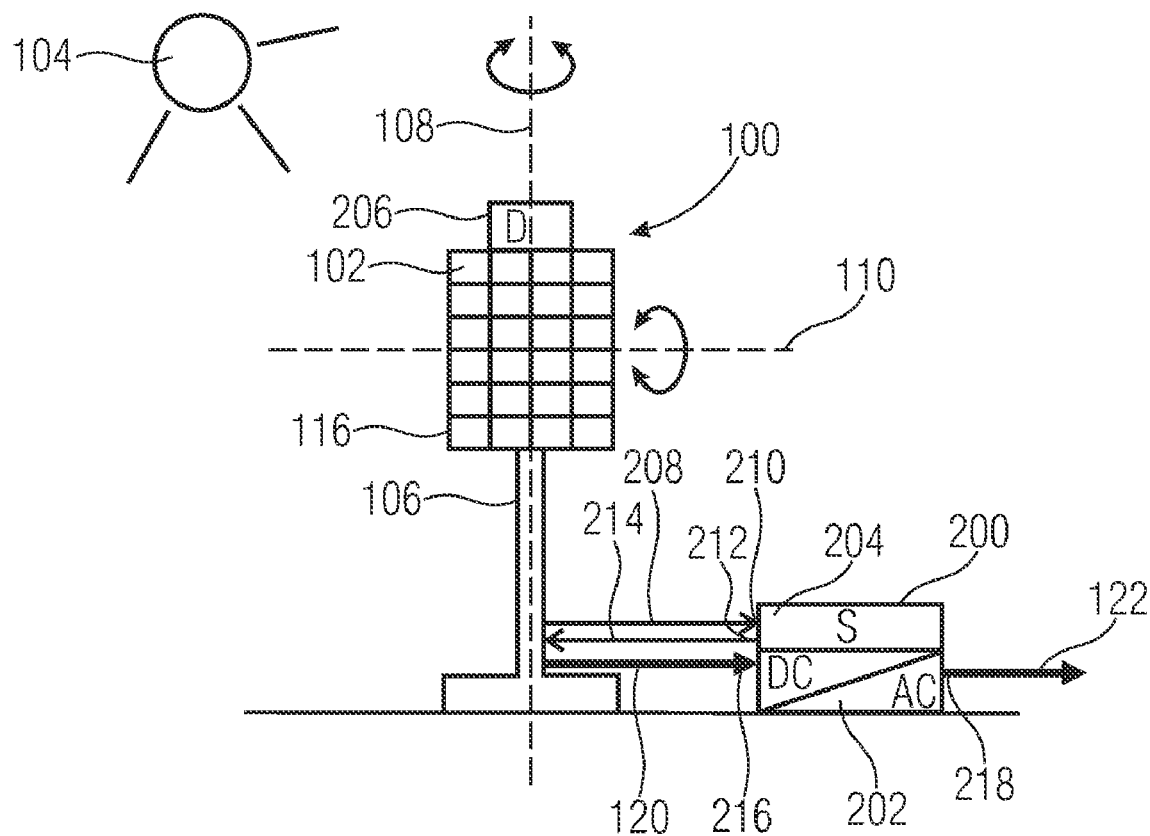
FIGS. 1A and 1B are an embodiment of tracked solar plant having an inventive inverter.
Figure 1B:
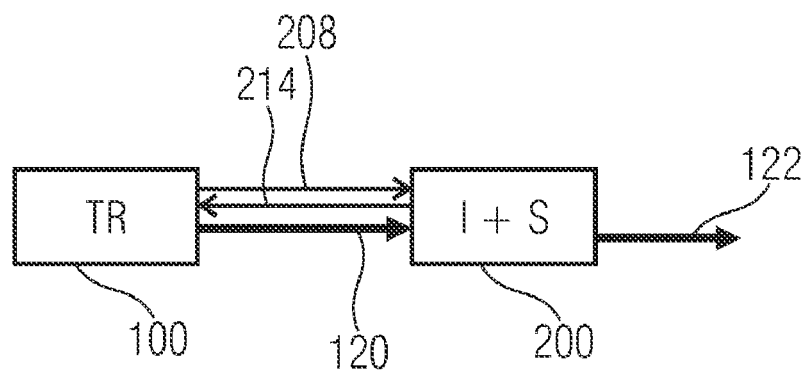
Figure 2A:
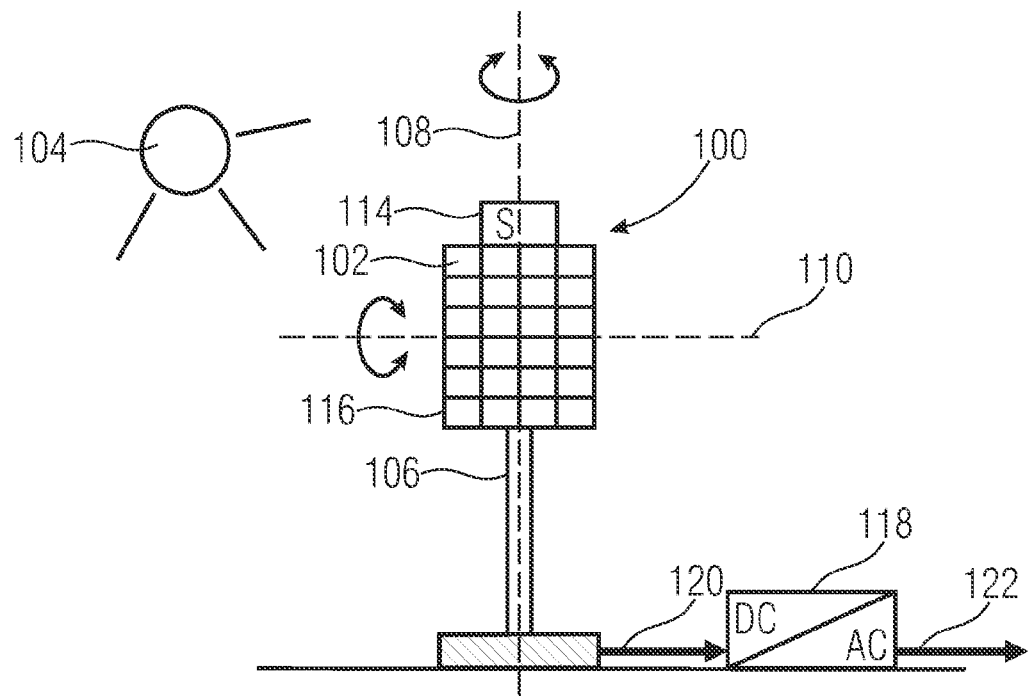
FIGS. 2A and 2B are an example for a conventional tracked solar plant.
Figure 2B:
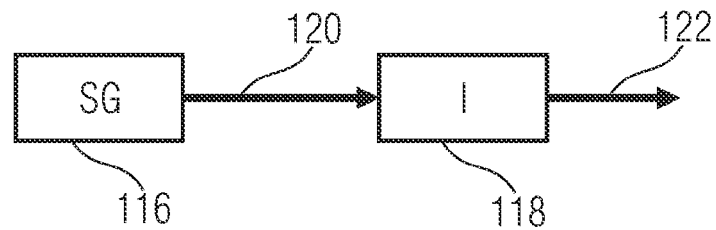
Figure 2B:
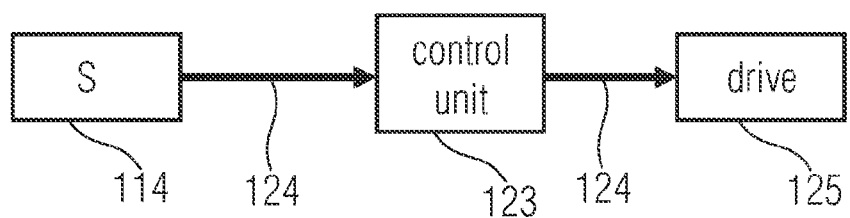

FIG. 1A shows a schematical illustration of a solar plant comprising a solar generator 116, similar to FIG. 2, which comprises a plurality of solar modules 102 and is mounted on the tracker 100. By a drive not shown in FIG. 1, the solar generator 116 is pivoted around the axes 108 and 110 and can be tracked after the sun 104.

In contrary to the conventional approach described based on FIG. 2, an inverter 200 is provided in the embodiment of the present invention shown in FIG. 1A, which comprises the conversion circuit 202 for converting a received direct current (DC) to an alternating current (AC). Further, the control/regulation 204 is integrated in the inverter 200, which generates a control signal for the tracker 100 for controlling its drive such that the solar generator 116 is tracked after the sun 104 or the brightest point at the sky, respectively (e.g. when it is cloudy), over the course of the day.

Further, in the embodiment shown in FIG. 1A, a sensor or detector 206, respectively, is provided, which generates an intensity signal in dependence on the impinging light and provides the same to an input 210 of the inverter 200 via a sensor signal connection 208. The control 204 in the inverter 200 is connected to the input 210 for generating a control signal for driving the tracker 100 in dependence on the received intensity signal and to provide the same at a control signal output 212 of the inverter 200. In the shown embodiment, the control signal is provided to the tracker 100 via the control signal line 214 from the inverter 200 for allowing a respective adjustment of the drive.

In connection with the detector means 206, it should be noted that the same can comprise one or several sensor cells, wherein in the case of providing several sensor cells, also, several intensity signals are provided to the control 204, which are then evaluated for tracking the solar generator, for example in a way as described in DE 100 43 525 A1.

Further, the inverter comprises the direct current input 216 and the alternating current output 218 for, like in FIG. 2, receiving the direct current from the solar generator 116 via the lines 120 and 122, or to output the converted alternating current, respectively.

FIG. 1B shows the arrangement described in FIG. 1A again schematically.

According to the invention, saving the necessitated costs is obtained by using the resources of the inverter for implementing the control for generating the tracking signal for the solar generator, which comprises, for converting the direct current to the alternating current, apart from the power switches also a respective control unit, e.g. in the form of a microprocessor and respective memory elements. Thus, for implementing the control for tracking the solar generator, these resources can be accessed, so that apart from a compact construction, the above-mentioned cost savings can also be obtained.

Further, by combining the regulations/controls for current conversion or tracking, the behavior of the overall system can be improved significantly and the overall efficiency can be increased.

Based on FIG. 1, an embodiment has been described where the detector or sensor 206, respectively, is illustrated as part of the tracker 100. The present invention is not limited to such an implementation, rather, in another embodiment, the detector or the sensor cells 206, respectively, can also be integrated in the inverter, and in such a case the sensor signal line 208 and the respective sensor signal input 210 would be omitted, which causes a further simplification with regard to the usage of the inverter, since the same can also be operated by conventional tracked solar plants, without necessitating retrofitting the same with a detector and respective sensor line.

According to a further embodiment, the detector can be implemented as a separate detector, which is arranged externally of the solar generator or tracker, respectively, and externally of the inverter, and is connected to the sensor signal input 210 of the inverter 200 via a respective sensor signal line.

According to a further embodiment, the detector can be omitted. In this case, tracking the solar generator is performed based on astronomical calculations by the control unit of the inverter.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An inverter for converting the direct current provided by a solar generator to alternating current, wherein the solar generator comprises a drive allowing orientation of the solar generator in a desired direction,
   wherein
   a control is integrated in the inverter, which provides a control signal for the drive of the solar generator for effecting tracking the solar generator after the sun.

2. The inverter according to claim 1, comprising:
   at least one sensor generating an intensity signal in dependence on the light impinging on the sensor, wherein the control receives the intensity signal and provides the control signal based on the intensity signal, and
   a control signal output to which the control applies the control signal.

3. The inverter according to claim 1, comprising:
   a sensor signal input for receiving an intensity signal generated by an external sensor in dependence on the light impinging on the sensor, wherein the control is connected to the sensor signal input for receiving the intensity signal and generating the control signal based on the intensity signal; and
   a control signal output to which the control applies the control signal.

4. The inverter according to claim 3, wherein the external sensor is mounted on the solar generator or wherein the external sensor is formed by one or several solar modules of the solar generator.

5. The inverter according to claim 1, comprising:
a direct current input for receiving the direct current generated by the solar generator;
a conversion circuit connected to the direct current input for converting the direct current to alternating current; and
an alternating current output connected to the conversion circuit for outputting the alternating current.

6. The inverter according to claim 1, comprising:
a control unit controlling the conversion of the direct current to the alternating current, wherein the control for generating the control signal for the drive of the solar generator is integrated in the control unit.

7. A solar plant, comprising:
a solar generator; and
an inverter for converting the direct current provided by a solar generator to alternating current, wherein the solar generator comprises a drive allowing orientation of the solar generator in a desired direction,
wherein
a control is integrated in the inverter, which provides a control signal for the drive of the solar generator for effecting tracking the solar generator after the sun.

* * * * *